United States Patent [19]

Culhane et al.

[11] 4,310,119
[45] Jan. 12, 1982

[54] HONEY EXTRACTOR

[76] Inventors: Vernon C. Culhane, 2729 County Rd.; Danny F. Culhane, 300 Waters Way, both of Durango, Colo. 81301

[21] Appl. No.: 67,017

[22] Filed: Aug. 16, 1979

[51] Int. Cl.³ .................... B04B 11/00; B01D 43/00
[52] U.S. Cl. .................................. 233/1 R; 210/361; 233/20 R
[58] Field of Search ............... 233/1 R, 23 R, 25, 26, 233/27, 20 R; 210/361

[56] References Cited

U.S. PATENT DOCUMENTS

| 1,491,868 | 4/1924 | Kunkel | 210/361 X |
| 1,606,603 | 11/1926 | St. Clair | 210/361 X |
| 1,657,717 | 1/1928 | Hodgson | 210/361 |
| 1,791,605 | 2/1931 | Root | 210/361 |
| 2,203,438 | 6/1940 | Maendel | 210/361 |
| 3,007,255 | 11/1961 | Mandrapa | 210/361 X |
| 3,011,646 | 12/1961 | Boronkay | 210/361 |
| 3,351,273 | 11/1967 | Harrison | 233/20 R |
| 4,148,733 | 4/1979 | Gamble | 210/361 |

FOREIGN PATENT DOCUMENTS 1296658  5/1961  France .......................... 210/361

Primary Examiner—Stanley N. Gilreath
Attorney, Agent, or Firm—Harvey B. Jacobson

[57] ABSTRACT

A swing-type centrifugal extractor has a main body rotatable about a vertical axis which is pivotally attached to a plurality of platforms which, in the quiescent state, depend from their pivotal attachment to the body. A honey pan having an inner peripheral edge spaced above the pan bottom receives a capping catcher which includes a mesh body held within a solid frame. A fixed frame super is uncapped by severing the cappings from the super combs in a manner which allows the cappings to remain adhered to the combs by viscosity of honey. The fixed frame super is rested upon the capping catcher in the pan and the pan rests upon one of the extractor platforms. The extractor body is rotated and the platforms extend radially outward. Centrifugal force causes the severed cappings to slide from the combs and rest in the capping catcher where most of the honey is drained from them. The centrifugal force also causes extraction of honey from the honey combs. Various attachments are also provided for adapting the pan to use with movable frame combs to facilitate extraction of honey from these also.

18 Claims, 14 Drawing Figures

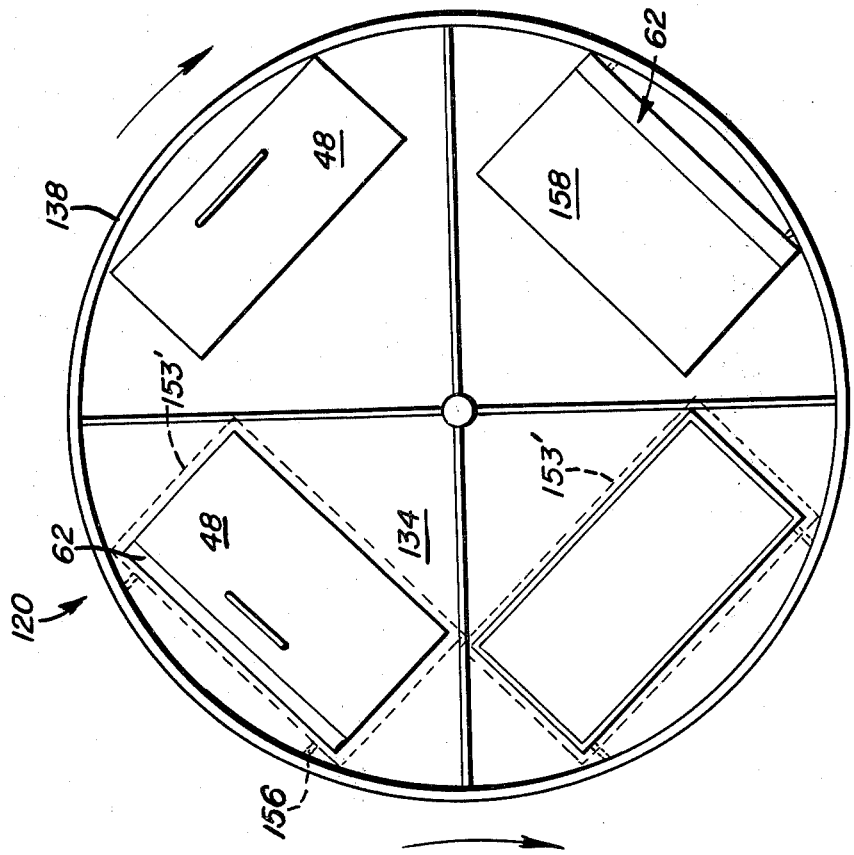
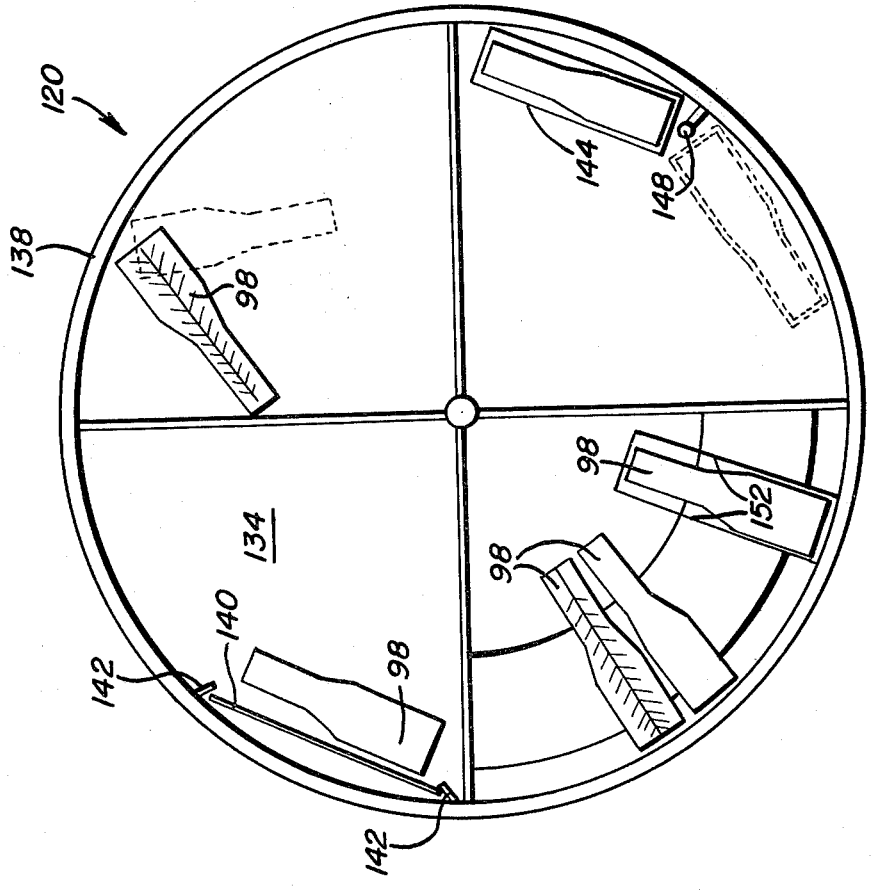

HONEY EXTRACTOR

BACKGROUND OF THE INVENTION

1. Field of the Invention

This invention relates to honey extraction devices and especially to such devices which operate under centrifugal force to effect honey extraction.

2. Description of Related Art

Fixed frame extracted honey production (handling whole extracting honey supers as a unit instead of the individual movable frames) has been assumed to be more efficient in labor handling and equipment for a long time. As far back as the early thirties, several Western beekeepers used oversized conventional radial extractors to remove honey from small supers after the combs had been uncapped individually and returned to the supers. About the same time, it was known that extracted honey coming from a comb if caught and retained in the extracting reel until it was stopped would improve flavor and clarity, and probably cleanliness, because it was saved from the violent action of being thrown from a speeding extractor reel and smashing against a solid stationary extractor wall.

In the 1960's, a few large extractors were built to quickly extract honey from fixed frame supers and hold it in the reel until it was stopped before discharging. They were so large and expensive that only the largest beekeepers could afford them. Also, they would not handle conventional single movable combs and would require that a beekeeper replace all of his combs with those adapted to the new extractors. Today, even though the theory of fixed frame extraction appears beneficial, few beekeepers are actually using this method.

U.S. Pat. No. 3,351,273, issued Nov. 7, 1967, to Harrison, shows one form of a swing-type centrifugal extractor. The Harrison apparatus includes an elongated shaft mounted on a pedestal for rotation about a substantially vertical axis. A first wheel is mounted concentrically on the shaft to support honey extraction supers and a second wheel of larger diameter is mounted on the shaft above the super support wheel. The second wheel serves to support containers for centrifugally separating honey from mulched honeycomb cappings. A cage for providing supports for a plurality of honey extraction supers is mounted on the super support wheel and includes a funnel mounted on the bottom thereof. Each funnel has a discharge opening and a ball valve for allowing the extracted honey to be removed.

SUMMARY OF THE INVENTION

One object of the present invention is to provide a honey extractor which can easily be designed to fit the operation of a beekeeper whether the operation is small, medium or large.

A further object of the present invention is to provide a honey extractor which allows for use with attachments so that any beekeeper can extract his movable frames as well as fixed frame supers.

Yet another object of the present invention is to provide a honey extractor which utilizes a removable pan for supporting the honey containing elements.

Yet a still further object of the present invention is to provide a honey extraction system including a loading apparatus for loading honey pans onto a swing-type centrifugal extractor.

One further object of the present invention is to provide a honey extractor in which honey can be extracted from honey combs and cappings in a single process wherein the cappings are kept for later melt down.

One further additional object of the present invention is to provide a honey extractor in which no parts of the extractor come in direct contact with the honey except the parts that are removed with the honey and supers for transporting the honey to a later processing stage.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 13 is a top plan view of the extractor of FIG. 12 showing the use of four types of attachments for extracting honey from movable frames.

FIG. 14 is a top plan view of the extractor of FIG. 12 showing the use of attachments for extracting honey from fixed frame supers.

DESCRIPTION OF THE PREFERRED EMBODIMENT

Figure 1:
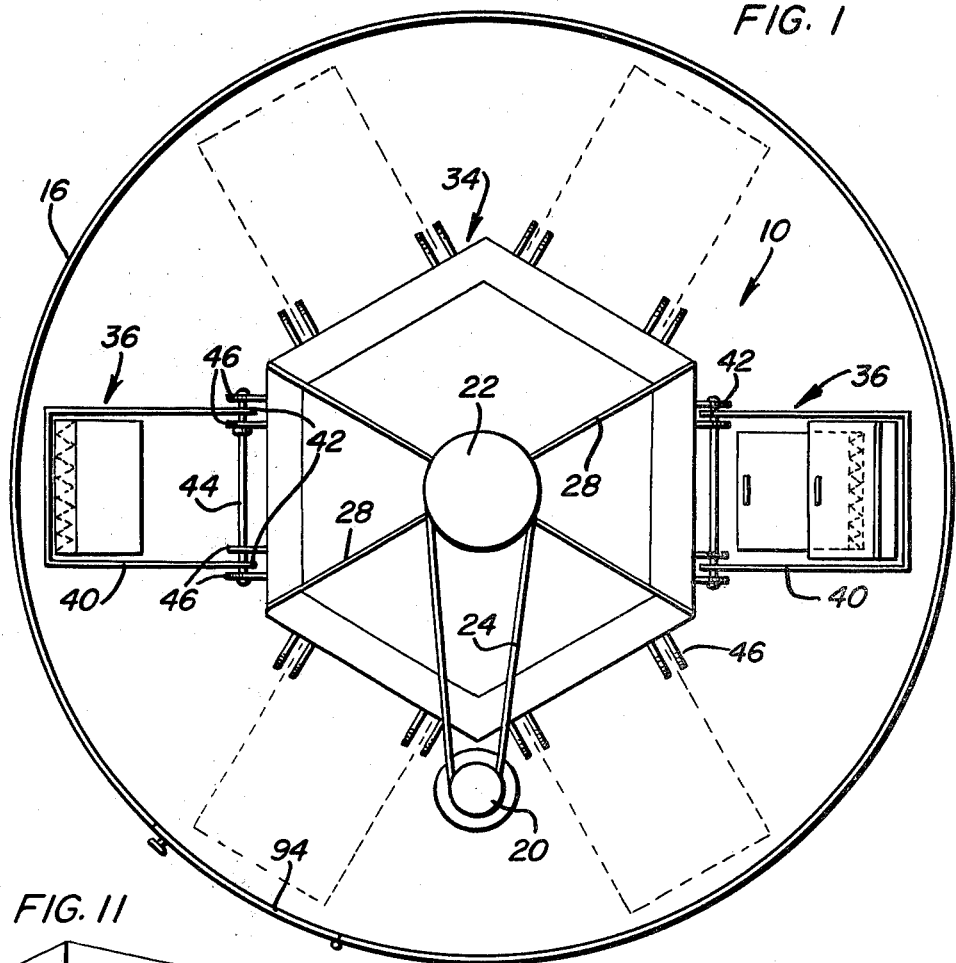
FIG. 1 is a top plan view of a swing-type centrifugal extractor of the present invention.
Figure 2:
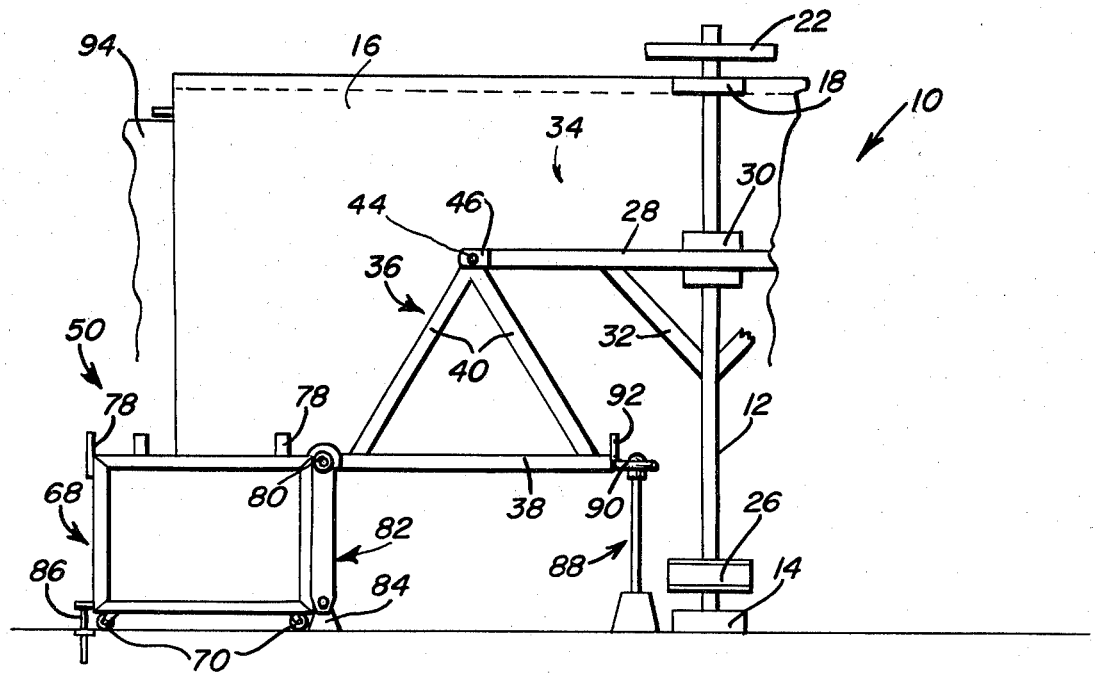
FIG. 2 is a front elevational view of the extractor of FIG. 1 shown in its loading mode.

Now with reference to the drawings, a honey extractor incorporating the principles and concepts of the present invention will be described in detail. With specific reference to FIGS. 1 through 3, a swing-type centrifugal extractor 10 will be described in detail. It can be seen that extractor 10 includes a central vertical drive shaft 12 which is mounted in a lower thrust bearing 14 firmly secured to the floor by any suitable means. A generally cylindrical housing 16 surrounds the extractor 10 and has a top portion which mounts a second thrust bearing 18 which supports the shaft 12 in a vertical orientation in order that the shaft can rotate about a vertical axis. A drive motor 20 is also attached to the housing top and is connected to a drive pulley 22 through a belt 24. Accordingly, through energization of the drive motor 20, the shaft 12 can be rotated about its vertical axis. A brake mechanism 26 is also operatively connected to the drive shaft 12. A plurality of radially extending braces 28 are firmly affixed to the shaft 12 through a collar 30. Cantilever supports 32 extend from the shaft 12 to braces 28 and are firmly attached therebetween for the purpose of providing rigidity to the braces. A wing support frame 34, which is shaped as a hexagon to accept six wing sections 36 is mounted to the braces 28 substantially coaxially with the drive shaft 12. It will be understood that the shape of the wing support frame is arbitrary and would be adjusted to suit the desired number of wing sections 36.

Figure 3:
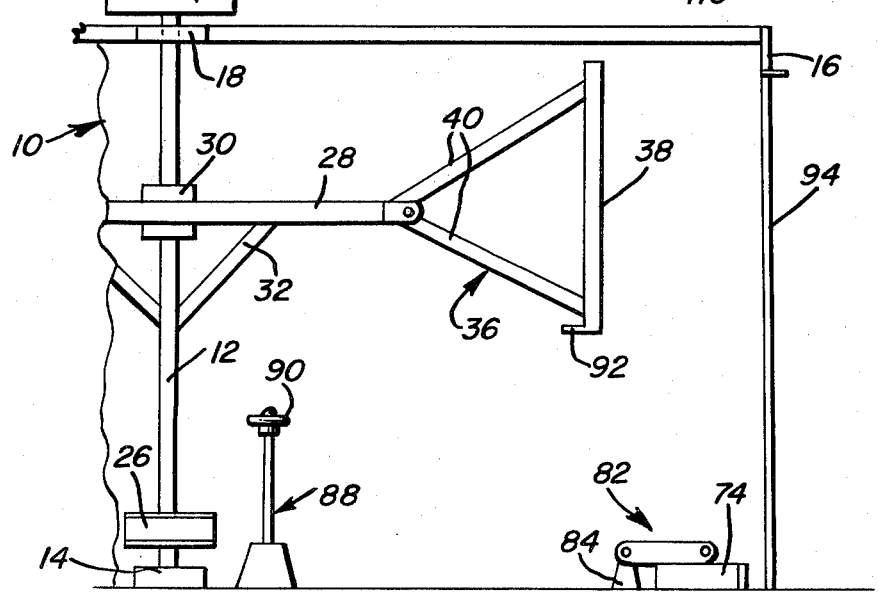
FIG. 3 is a rear elevational view of the extractor of FIG. 1 shown in its operational mode.
Figure 5:
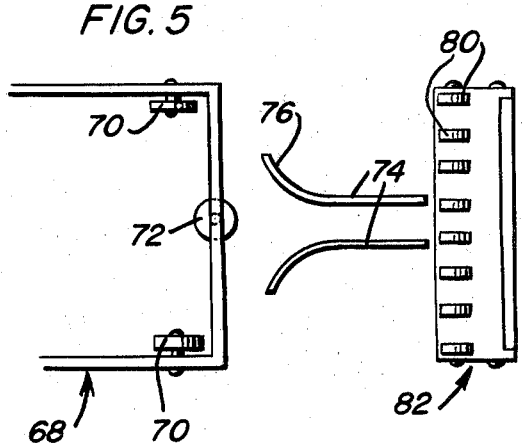
FIG. 5 is a top plan view of a loading mechanism for the extractor of FIG. 1.

Each wing section 36 includes a substantially flat platform or base 38 which is substantially rectangular in shape and has legs 40 connected to each of its corners. Pairs of legs 40 converge to form two mounting points 42 which are pivotally connected to hinge bar 44. The hinge bar 44 extends through the leg pairs and also through mounting braces 46 which extend in pairs away from each straight section of the hexagonal frame 34 to surround each of the mounting points 42. Accordingly, each wing section 36 is free to pivot about a hinge bar 44 and remains in a vertically depending position from the hinge bar when the extractor 10 is in the quiescent state, as shown most clearly in FIG. 2. When motor 20 is energized and the shaft 12 begins to rotate, centrifugal force causes each wing section to assume a position extending radially away from the frame 34 as shown in FIG. 3. The wings can be made in any size desired, but preferably would be constructed to accommodate a full load of supers with a gross weight of approximately 350 pounds.

Figure 11:
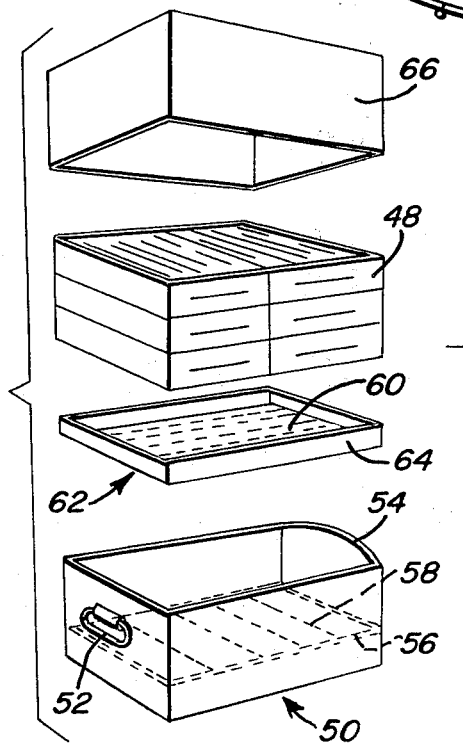
FIG. 11 is an exploded view showing the pan structure, capping catcher, fixed frame supers and the pan cover of the present invention.

Now with reference to FIG. 11, there will be seen one configuration for holding a plurality of fixed frame supers 48. A honey pan 50 is generally rectangularly shaped and has a handle 52 on its forward end for sliding the pan onto and off of a platform 38. The rearward side 54 of the pan is bent outwardly and shaped as a spout to facilitate the pouring of honey which has accumulated into the pan through the extraction process. Also, an inner peripheral rib or ledge 56 extends completely around the inside of the pan and is spaced above the bottom of the pan by a distance sufficient to hold all of the extracted honey. Also, a plurality of lateral support members 58 extend across the pan to support the screen 60 of a capping catcher 62. The capping catcher 62 has a sturdy outer peripheral frame 64 which supports the outer edge of the screen 60 and rests upon ledge 56 of the pan to support the screen above the pan bottom. The purpose of the capping catcher 62 is to hold cappings which are cut from the combs of the fixed frames 48 when the cappings are removed under centrifugal force, as will be described more fully hereinafter. The fixed frame supers 48 rest directly on the frame 64 of the capping catcher 62 and are thus maintained above the bottom of the pan 50 also. A fixed frame super is, of course, a well-known element in the art of beekeeping and has solid connections between all parts. Each fixed frame super includes a plurality of thin members upon which the honeycombs are formed. The combs are formed with chambers slanting in a common direction and, of course, the supers would be placed in pan 50 with the chambers slanted toward the bottom of the pan in order that centrifugal action would force the honey out of the chambers and into the pan bottom. A sheet metal canopy or top 66 is provided for the purpose of covering the entire honey pan, capping catcher and fixed frame combination so that when the pan is disposed on a wing section and moving therewith the supers will not be adversely affected by high speed movement through the air.

Figure 6:
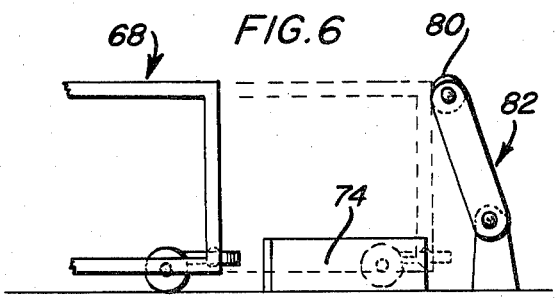
FIG. 6 is a side elevational view of the loading mechanism of FIG. 5.

Since the combination of elements seen in FIG. 11 and described above is designed to weigh approximately 350 pounds gross, some means of easily loading and unloading each wing section is necessary. For this purpose the apparatus shown in FIGS. 2, 3, 5 and 6 has been provided. This loading apparatus includes a cart 68 upon which the combination shown in FIG. 11 is transported to the extractor 10. The cart 68 can have caster wheels 70 to insure directional controllability and should be of a height approximately equal to that of platform 38 when the platform is in its depending position shown in FIG. 2. A small guide wheel 72 is connected to the front lower portion of the cart and is capable of turning about a vertical axis. A pair of guide rails 74 are attached to the floor and have diverging forward edges 76 which abut against wheel 72 to guide the cart into alignment with a platform 38. Upwardly projecting lips 78 are connected about the upper edge of the cart on three sides to maintain the pan properly aligned on the top surface of the cart. Accordingly, when the cart is guided into position by wheel 72 and guides 74, the pan will be properly aligned for movement onto a waiting platform 38. The cart is designed such that the forward edge of the pan 50 will extend past the front of the cart in order to facilitate transfer of the pan from the cart to the platform. In order to further aid in this transfer, a plurality of rollers 80 are rotatably mounted at the top of a roller support mechanism 82 and are disposed between the cart and the platform 38 when the cart is its transfer position. The rollers 80 extend slightly above the cart upper surface and thus force the lower edge of the pan 50 to rise as the cart is pushed forwardly to its final position. This upward tilting of the pan 50 is caused by the interaction of the cart and roller support 82. Support 82 is pivotally connected to a base section 84 which is fixedly attached to the floor as by bolting or any other suitable means. The rollers 80 which are attached to the top of the roller support 82, abut the forward edge of cart 68 when the cart is moved into position between guide rails 74. As the cart is pushed forwardly, the rollers ride up along the forward surface of the cart and the roller support 82 attains an erect position. When the rollers reach the top of the cart (as shown in phantom in FIG. 6), the further forward movement of the cart causes the rollers to abut against and move upwardly the lower surface of the pan 50 and its contents. Once the cart is in its forwardmost position, a bolt 86 is raised from the floor (see FIG. 2) and holds the cart in position while the pan 50 and its contents are transferred over rollers 80 onto the wing 36. A rear support 88 rises vertically from the floor and mounts a rubberized wheel 90 which is on a height equal to that of platform 38. The wheel 90 abuts the rear of platform 38 and holds it in position while the pan 50 is being transferred from the cart to the platform. A small fence 92 rises from the rear of the platform and acts as a stop for the pan 50 to hold the pan in the extracting position on the platform. When the system is in operation, as shown in FIG. 3, the wing 36 extends outwardly away from support 88 and roller support 82 lies on top of guide rail 74. Bolt 86 is retracted into the floor.

In operation, the fixed frame supers are moved through a first processing station whereat the cappings are severed from the combs. However, the severing process should be carried out with a thin knife or cutting edge that leaves the cappings adhered to their combs. The fixed frame supers are then transferred to the swing-type extractor 10 through the use of cart 68. A door 94 is, of course, provided in the housing 16 surrounding the swing-type extractor. The honey pan 50, together with its contents, including the fixed frame supers, is transferred onto one of the platforms 38 as discussed above. When all the platforms 38 are filled, the motor 20 is energized and the entire extractor begins to rotate with the wings 36 being thrown radially outward under centrifugal force. The wings should be rotated under a force of 50 or more G's. This force will cause the severed cappings to slide from the honeycombs onto capping catcher 62. The honey will then be removed under centrifugal force from the combs and cappings alike. After the extractor 10 has been stopped, the pans 50 are removed by the use of the cart 68. The extracted supers are unloaded from the pan and the dry cappings are placed in a capping melter. This results in a less messy way of processing cappings and produces higher quality honey from the cappings. Furthermore, labor is saved by the fact that the fixed frame supers can be placed in the honey pan prior to the uncapping process. Also, the supers are not handled again individually until they are ready to be stacked after extracting.

The use of removable honey pans makes it possible to avoid direct contact between extractor parts and the honey. This improves the cleanliness of the honey and, since the elements which contact the honey are removable, they can be cleaned more readilay by the use of mechanical devices, such as dishwashers, and the like.

Figure 7:
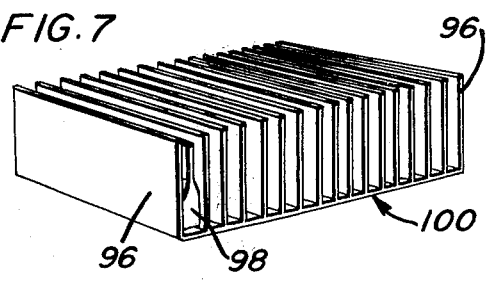
FIG. 7 is an attachment for removing honey from movable frame honeycombs.
Figure 8:
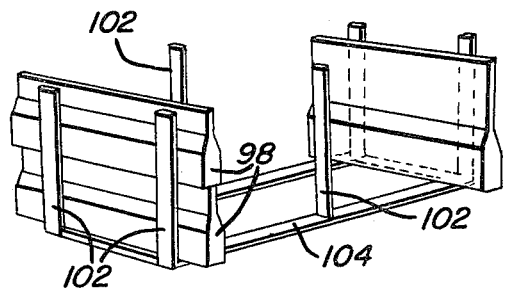
FIG. 8 is an attachment for stacking movable frame honeycombs for the removal of honey therefrom.

The honey pan and the cart for loading it can easily be adapted for use with movable frame extracting also. Combs in movable frames can be uncapped in a conventional manner, placed vertically on the capping catcher 62 in the honey pan 50. Only limited support would be necessary to maintain the combs in a vertical position during movement and the extracting process. Examples of attachments which serve this purpose can be seen in FIGS. 7 and 8. FIG. 7 shows a comb support for movable frames which includes upright grids 96 which are spaced laterally by a width sufficient to accept the movable combs 98 therebetween. A lower framework 100 holds the grids together in the upright position and allows the honey to flow through its open center into the honey pan in which the comb support is disposed. Several of these comb supports could be placed in one honey pan in vertical stacked relation. Similarly, the device shown in FIG. 8 can be used to stack individual honeycombs 98 between uprights 102 with sufficient combs being stacked between adjacent uprights for the force applied between adjacent combs to hold the combs in position. A lower frame 104 holds the uprights in spaced relation in a manner similar to that done by frame 100 of the device shown in FIG. 7.

Figure 4:
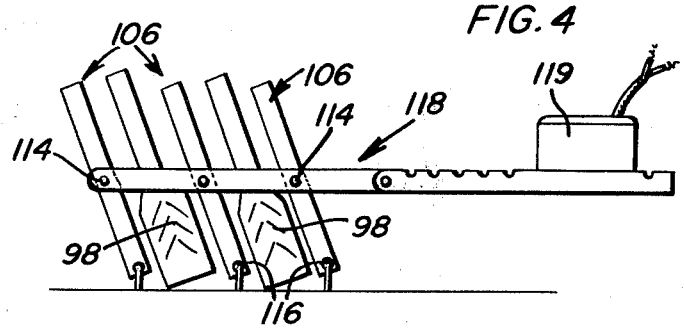
FIG. 4 shows an attachment for extracting honey from movable frame honeycombs.
Figure 9:
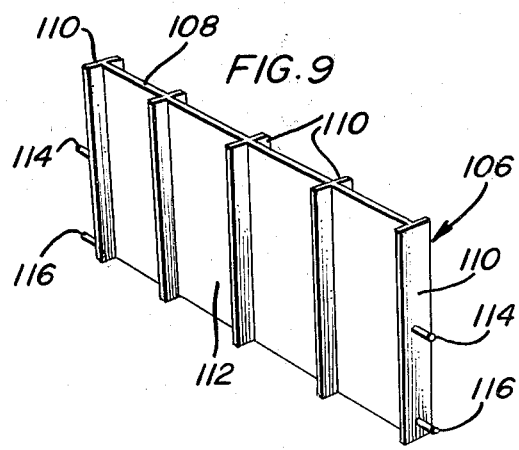
FIG. 9 is a ribbed baffle for insertion between movable frame honeycombs.

Weaker combs or thicker honey requiring higher speeds and more vigorous extracting forces might need pivoting baffles for extracting honey from one side of the comb at a time. The honey pan can easily be used for such an extracting method by placing a pivoting support, such as that shown in FIG. 4, within the honey pan. FIG. 4 shows a pivoting support which includes a plurality of baffles 106 which separate adjacent rows of movable frames 98. As seen in FIG. 9, each baffle 106 comprises a substantially planar divider wall 108 which is connected to laterally extending divider panels 110 which divide the baffle into a plurality of recesses 112 to channel the honey away from the comb frames 98. The divider panels 110 disposed at each end of the divider wall are equipped with mounting pins 114 and 116. Pins 116 pivotally mount each of the baffles 106 to a lower fixed frame, as shown in FIG. 4. Pins 114 pivotally mount the baffles 106 to a movable center frame 118 which is moved laterally by motor 119 upon a desired command. Movement of frame 118 causes the baffles 106 to tilt at predetermined angles thereby allowing each side of the individual combs 98 to be extracted.

Figure 12:
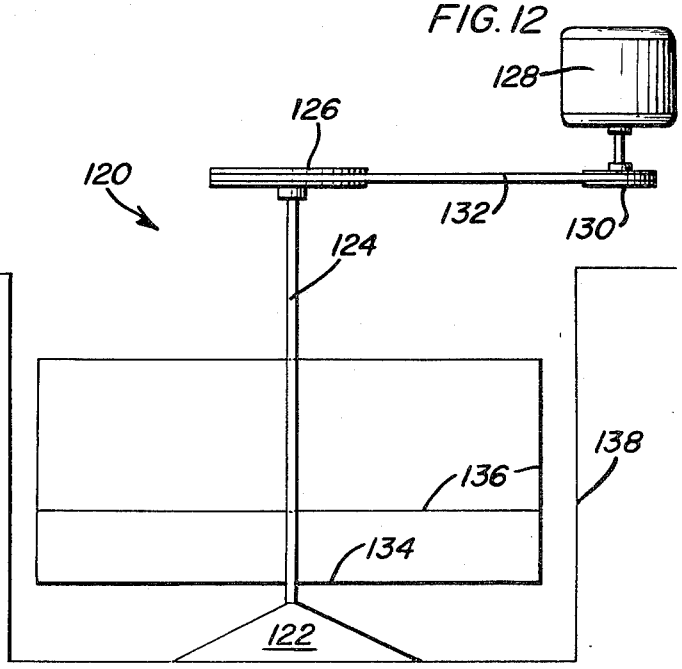
FIG. 12 is a side elevational view of a reel-type centrifugal extractor.
Figure 10:
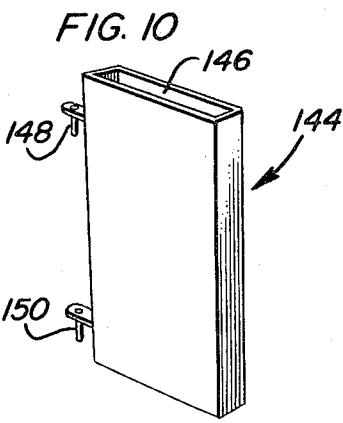
FIG. 10 is another attachment for extracting honey from movable frames by a centrifugal extractor.

The principles of the present invention are also applicable for use with a reel-type centrifugal extractor such as that shown in FIG. 12 and generally labeled with the reference numeral 120. Extractor 120 includes a pedestal base 122 which rotatably mounts shaft 124. A drive pulley 126 drives the shaft when energized by motor 128 through drive pulley 130 and belt 132 in a manner similar to the drive system of the extractor 10. A disc-shaped support surface or turntable 134 is mounted to the shaft 124 and supports either the fixed frame or movable comb structures. A framework 136 extends about the periphery of turntable 134 for supporting the movable or fixed frames during rotation of the turntable 134. The framework 136 would, of course, be suitably attached to shaft 124 to provide proper support. An outer wall 138 is disposed about the periphery of disc 134 and, under ordinary reel-type extraction procedures, would serve to collect any honey extracted from the honey bearing structures. With reference to FIG. 13, it will be seen that the reel-type extractor 120 can be used to accommodate movable combs for individual comb extraction in a variety of ways. The extractor 120 is shown divided into four segments with each segment demonstrating a different manner of extraction. In the upper left portion of FIG. 13, it will be seen that a rigid mesh 140 is slidably received between a pair of guides 142. A movable frame 98 is positioned against the mesh 140 while extracting one side of the comb. It will be necessary to lift the comb by hand and reverse it to extract the opposite side. Pivoting of the individual movable frame combs can be facilitated by the use of a support structure similar to that shown in FIG. 10. The support structure shown in FIG. 10 and generally referred to by the reference numeral 144 is generally rectangular in shape and has an open interior 146 for receiving the individual combs. A pair of mounting pins 148 and 150 on comb support 144 are shown pivotally attached to extractor 120 in FIG. 13 in the lower right hand portion of that figure. Structure 144 is free to pivot about mounting pins 148 and 150 in order that both sides of the movable frame combs can be extracted individually. Each support 144 would be configured as a basket to allow the honey to flow through it and strike against wall 138 in a conventional manner. In the upper right portion of FIG. 13, a movable frame comb 98 to be used with a basket 144 is shown without the supporting basket as being capable of pivoting to an angle which is limited to that necessary for the proper individual extraction of the opposite sides of the comb. Since the cells of the comb already slope toward the top of the comb, a smaller angle is required for proper honey extraction. Of course, the comb 98 shown in the upper right portion of FIG. 13 would be mounted in a support basket 144. Finally, the lower left hand portion of FIG. 13 depicts a radial extraction method. Because of the upward slope of the cell walls, both sides of the comb will extract at the same time. The frames are each held in a fixed radial position and can include side supports 152 at the sides of the comb to hold it in the exact extracting position and reinforce the comb while under the extracting centrifugal forces.

FIG. 14 demonstrates the use of a reel-type extractor for removing honey from fixed frame supers. In the lower left hand portion of FIG. 14, there will be seen a position for mounting a plurality of movable frame combs. The movable frames will be mounted radially for extraction of both sides of each movable frame simultaneously. A plurality of movable frames can be attached in this position with their top bars oriented in the direction of travel of the turntable 134 rather than oriented vertically as shown in FIG. 13. A tray, shown in phantom at 153', could be placed below the movable frames to catch honey drippings from the frames after uncapping. In the upper left section of FIG. 14, there is shown a fixed frame super 48 connected to a capping catcher 62 with the capping catcher positioned radially away from the frame 48. Elementary brackets shown generally at 156 could be used to maintain the fixed frame super and capping catcher in position on the extractor. Again, a pan 153' could be disposed beneath the configuration to accumulate honey drippings. In the upper right hand portion of FIG. 14, there will be seen a fixed frame super 48 mounted with appropriate brackets for standard reel-type extraction wherein the honey is thrown against and accumulated on wall 138 which remains stationary with respect to the revolving disc 134. Finally, when using the reel-type extractor, it may be desirable to use standard uncapping procedures wherein the caps are placed in a separate known capping basket 158. The basket 158 is placed next to a capping catcher 62. The use of the capping catcher is not necessary with a capping basket but can be used since generally the screens of a capping basket are generally larger than those used with the capping catcher of the present invention and thus the honey would be cleaned better by using the capping catcher.

It should also be noted that a standard known capping basket 158 can be used with the swing-type extractor 10 by dimensioning it properly to fit on top of the capping catcher 62 shown in FIG. 11. In this manner, the cappings can be removed by any standard known process and disposed in the capping basket for centrifugal extraction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for centrifugal extraction of honey from honey bearing combs, said apparatus comprising in combination:
   motor means;
   a drive shaft operatively connected to said motor means for rotation about a vertical axis;
   supporting structure connected to said drive shaft including a portion displaceable from a loading position to an extracting position in response to rotation of the drive shaft;
   containment means for supporting said honey bearing combs on said portion of the supporting structure during extraction of honey therefrom and means having a support surface substantially coplanar with said portion of the supporting structure for transfer of the containment means to and from said portion of the supporting structure in the loading position,
   said containment means including a pan having a supporting portion for supporting said honey bearing combs and an extracted honey receiving portion.

2. The apparatus defined in claim 1 wherein said containment means further includes a capping catcher means disposed between said supporting portion and said extracted honey receiving portion.

3. The apparatus defined in claim 2 wherein said capping catcher means comprises a peripheral frame supporting a perforate body portion.

4. An apparatus for centrifugal extraction of honey from honey bearing combs, said apparatus comprising in combination:
   motor means;
   a drive shaft operatively connected to said motor means for rotation about a vertical axis;
   supporting structure connected to said drive shaft including a portion displaceable from a loading position to an extracting position in response to rotation of the drive shaft;
   containment means for supporting said honey bearing combs on said portion of the supporting structure during extraction of honey therefrom, means having a support surface substantially coplanar with said portion of the supporting structure for transfer of the containment means to and from said portion of the supporting structure in the loading position, said transfer means including a loading cart having said support surface on which said containment means is transported to and from said supporting structure, guide rails interacting with said cart for aligning said cart with said supporting structure, and roller means for aiding movement of said containment means between said cart and said supporting structure, said roller means being pivotally mounted for movement between a position above the support surface and a retracted position below the support surface.

5. In an apparatus for extracting honey from a honey-impregnated honeycomb, having a supporting structure rotatable about an axis, and a containment assembly within which the honeycomb is supported on the structure during rotation, the improvement residing in said containment assembly including a frame within which the honeycomb is seated and a capping catcher in operative relation thereto, and peripheral means retaining the containment assembly orientated on the structure during rotation for centrifugal separation of the honey from the honeycomb and the capping catcher.

6. The apparatus of claim 5 wherein said supporting structure includes a basket and pivot means for pivotally supporting said basket for movement about a vertical axis.

7. The combination of claim 5 wherein said supporting structure includes mesh orientating the honeycomb with one side facing radially outward.

8. The combination of claim 5 wherein said containment assembly includes a tray for supporting movable combs which are laid flat.

9. In a centrifugal honey extracting apparatus, the combination of: a removable honey collection pan, said pan having peripheral walls and a bottom; support means connected to said pan for supporting honey bearing combs in said pan at a position spaced from said bottom; and handle means attached to said pan to facilitate movement of said pan.

10. The combination defined in claim 9 wherein said support means comprises an inner peripheral ridge for supporting fixed frame supers.

11. The combination of claim 10 and further including a capping catcher supported on said ridge, said capping catcher including a perforate body portion for separating cappings from honey.

12. The combination of claim 9 wherein said support means includes movable frame honeycomb retainer means for retaining removable frame honeycombs in said pan.

13. The combination of claim 12 wherein said movable frame honeycomb retainer means comprises an open peripheral framework having a plurality of separators extending upwardly therefrom for separating individual movable frame honeycombs.

14. The combination of claim 12 wherein said movable frame honeycomb retainer means comprises a plurality of partitions hingedly connected to a base and hingedly connected to a movable frame for movement between a first angularly oriented position and a second angularly oriented position for extracting honey from individual sides of a honeycomb one at a time.

15. The combination of claim 9 and further including a removable cover for covering said pan.

16. The combination of claim 15 wherein one portion of said peripheral wall of said pan is formed as a spout to facilitate removal of extracted honey.

17. In a centrifugal apparatus for extracting honey from combs, a honey collection pan having a peripheral wall and a bottom, a frame within which the combs are seated, a removable capping catcher, and means connected to the pan for supporting the frame and the catcher adjacent to each other in spaced relation to the bottom.

18. The combination of claim 17 wherein said frame includes a plurality of grids separating the combs from each other in loosely stack relation.

* * * * *